US009360984B2

(12) United States Patent
Yang

(10) Patent No.: US 9,360,984 B2
(45) Date of Patent: Jun. 7, 2016

(54) METHOD AND SYSTEM FOR PROVIDING ONLINE FLASH GAME

(71) Applicant: NHN Entertainment Corporation, Seongnam-si (KR)

(72) Inventor: Zoo Il Yang, Uiwang-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 0 days.

(21) Appl. No.: 14/826,669

(22) Filed: Aug. 14, 2015

(65) Prior Publication Data

US 2015/0355761 A1     Dec. 10, 2015

Related U.S. Application Data

(63) Continuation of application No. 11/498,412, filed on Aug. 2, 2006, now Pat. No. 9,138,643.

(30) Foreign Application Priority Data

Aug. 2, 2005    (KR) .................. 10-2005-0070615
Aug. 23, 2005   (KR) .................. 10-2005-0077440

(51) Int. Cl.
     *G06F 17/00*      (2006.01)
     *G06F 3/048*      (2013.01)
     *A63F 13/30*      (2014.01)

(52) U.S. Cl.
     CPC ............... *G06F 3/048* (2013.01); *A63F 13/12* (2013.01); *A63F 2300/308* (2013.01); *A63F 2300/407* (2013.01)

(58) Field of Classification Search
     CPC ............. A63F 13/12; A63F 2300/308; A63F 2300/207
     See application file for complete search history.

(56) References Cited

U.S. PATENT DOCUMENTS

| | | | |
|---|---|---|---|
| 5,935,002 A | 8/1999 | Falciglia |
| 5,946,664 A | 8/1999 | Ebisawa |
| 6,196,920 B1 | 3/2001 | Spaur et al. |
| 2003/0083943 A1 | 5/2003 | Adams et al. |
| 2004/0242322 A1 | 12/2004 | Montagna et al. |

FOREIGN PATENT DOCUMENTS

| | | |
|---|---|---|
| KR | 10-2001-0090015 | 10/2001 |
| KR | 10-2002-0035029 | 5/2002 |

OTHER PUBLICATIONS

Flash Hacks 100 Industrial-Strengh Tips & Tools. O'reilly Japan, Inc., Jul. 1, 2007, First vol., p. 473-480, 488-494, ISBN: 4-87311-235-4 & its English Abstract in 20 pages.

(Continued)

*Primary Examiner* — Reginald Renwick
(74) *Attorney, Agent, or Firm* — H.C. Park & Associates, PLC

(57) ABSTRACT

The present invention relates to an online flash game system and method, a flash game web page providing method, a web server for providing web pages for flash game execution, and a storage medium for recording method programs. When a flash game execution is selected, a skin flash module performs a skin flash, which is a frame on a flash game screen, on a user terminal screen, and controls a UI flash module and a game contents flash module. The skin flash module displays the skin flash, which is a frame on the flash game screen, on the user terminal screen, and controls the UI flash module and the game contents flash module.

25 Claims, 6 Drawing Sheets

(56) References Cited

OTHER PUBLICATIONS

Nikkei Internet Solutions, vol. 77 (Flash Application Development Floor, Second Lesson, Web Application with Flash), Nikkei BP. vol. 77, p. 126-131, Nov. 22, 2003 & its English Abstract in 12 pages.
Non-Final Office Action issued on Oct. 15, 2010, in U.S. Appl. No. 11/498,412.
Final Office Action issued on May 27, 2011, in U.S. Appl. No. 11/498,412.
Non-Final Office Action issued on May 30, 2014, in U.S. Appl. No. 11/498,412.
Non-Final Office Action issued on Dec. 22, 2014, in U.S. Appl. No. 11/498,412.
Notice of Allowance issued on May 14, 2015, in U.S. Appl. No. 11/498,412.

METHOD AND SYSTEM FOR PROVIDING ONLINE FLASH GAME

CROSS-REFERENCE TO RELATED APPLICATION

This application is a continuation of U.S. application Ser. No. 11/498,412, filed on Aug. 2, 2006, and claims priority from and the benefit of Korean Patent Applications Nos. 10-2005-0070615, filed on Aug. 2, 2005, and 10-2005-0077440, filed on Aug. 23, 2005, all of which are incorporated herein by reference for all purposes as if fully set forth herein.

BACKGROUND

1. Field

The present invention relates to an online flash game providing system, an online flash game providing method, a flash game web page providing method, a storage medium for recording a method program, and a web server for providing web pages.

More particularly, the present invention relates to an online flash game providing system, an online flash game providing method, a flash game web page providing method, a storage medium for recording a method program, and a web server for providing web pages wherein the system includes a web server accessed by a user terminal for execution of a flash game and a game server for transmitting and receiving game information to/from the user terminal when the flash game is executed, and the system controls the user terminal connected on a network to perform the flash game through a web browser.

2. Discussion of the Background

As the Internet has become widely used, various services have been provided over the Internet.

Accordingly, services of various categories, such as Internet-based online game services and various community services, in addition to the mail services in the earlier popularization stage of the Internet, have become available.

Particularly, many users use Internet game services, and the market volume of such services has gradually increased. For example, Go-Stop card games with 1:1 competition rules and various flash games have been provided through the Internet.

The flash game is a computer game generated by using Flash, which is an Internet moving picture producing software program, and the flash game is generated by applying the action script and motion graphics of the Flash program.

The categories of flash games range from the elementary and fun ones for children to ones for testing personality and mental states.

Representative games include sports games such as bowling and baseball, adventure games, puzzle/board games, games for women such as make up games, slide games, picture finding games, maze games.

Flash games are recently provided by Internet game service providers so that they may be used on line, and they are accordingly used by many users.

As a result, the flash games have become further various because of competition between service providers.

In general, a flash game has a file so that the game contents from the start and the end of the game and additional functions that are needed by the service provider in addition to the game are realized.

The flash game has parts that are processed in common, such as a part for providing rank information, a part for notifying events, a game start button, and a part of how to play the game, as well as the game contents that depend on the respective games.

However, the flash game generates the problem of repeated investment as the parts in common are individually developed for the respective flashes since the flash game has a single file from the start to the end of the game.

Particularly, when flash game sources are provided by a plurality of game development service providers, the parts that are realized in common for performing the flash game are repeated by the game development service providers, corresponding additional costs are generated, and the internal system information of the game service providers is consecutively supplied to the outside.

Further, as the flash games are diversified, it is only allowed to individually manage events or advertisements for the respective flashes when it is needed to quickly update the events or advertisements or totally manage them according to the service policy or the contract with the sponsor.

SUMMARY

The present invention has been made in an effort to more efficiently manage online flash game services.

Particularly, the present invention has been made in an effort to prevent repeated investment and increase development efficiency in the game developments for providing various flash games.

The present invention has been made in an effort to minimize the amount of internal system information to be made public in the case of receiving a flash game from external development service providers.

Also, the present invention has been made in another effort to totally manage the messages that are provided to the respective games when a message such as a event note is provided within the flash game.

Further, the present invention has been made in another effort to totally manage the users' responses to the messages that are provided in the flash game.

In one aspect of the present invention, an online flash game providing system including a web server accessed by a user terminal to perform a flash game, and a game server for transmitting and receiving game information to/from the user terminal when the flash game is performed, and controlling the user terminal connected through a network to perform a flash game through a web browser includes: a user interface (UI) flash module for realizing a flash based user interface on a flash game screen displayed to the user terminal; a game contents flash module for realizing flash based game contents; and a skin flash module, performed when the user selects execution of a predetermined flash game through the web server, for controlling the UI flash module and the game contents flash module to process the performance of the corresponding flash game, wherein the skin flash module provides a UI flash realized to the user terminal screen by the UI flash module and the game contents flash module, and a frame for the game contents flash.

In another aspect of the present invention, an online flash game providing system including a web server accessed by a user terminal to perform a flash game, a game server for transmitting and receiving game information to/from the user terminal when the flash game is performed, and a message server for providing a predetermined message to the user terminal, and controlling the user terminal connected through a network to perform a flash game through a web browser includes: a UI flash module for realizing a flash based message on a flash game screen displayed to the user terminal based on pre-stored message information; a game contents flash module for realizing flash based game contents; and a skin flash module, being performed when the user selects execution of a predetermined flash game through the web server, for realizing the game contents flash of the corresponding game based on flash game execution information, performing the UI flash module to realize the message of the corresponding game as a UI flash for providing a message from among the messages provided by the message server, and realizing the UI flash and the frame for the game contents flash into a flash.

In another aspect of the present invention, an online flash game providing method including a web server accessed by a user terminal to perform a flash game, and a game server for transmitting and receiving game information to/from the user terminal when the flash game is performed, and controlling the user terminal connected through a network to perform a flash game through a web browser includes: a) a skin flash module performing a skin flash, which is a frame on a flash game screen, on a user terminal screen when a predetermined flash game execution is selected; b) the skin flash module controlling a UI flash module and a game contents flash module to realize a user interface and game contents as flashes on a flash game screen displayed to the user terminal; and c) the game contents flash module loading game execution information for game contents execution to the user terminal to perform the game.

In another aspect of the present invention, an online flash game providing method including a web server accessed by a user terminal to perform a flash game, a game server for transmitting and receiving game information to/from the user terminal when the flash game is performed, and a message server for providing a predetermined message to the user terminal, and controlling the user terminal connected through a network to perform a flash game through a web browser includes: a) a skin flash module realizing a skin flash, which is a frame on a flash game screen, on a user terminal screen when a predetermined flash game execution is selected; and b) the skin flash module controlling a game contents flash module according to flash game execution information to realize a game contents flash of the corresponding game, and realizing a message from among messages provided by the message server into a UI flash for providing the message based on pre-stored message information by the UI flash module.

In another aspect of the present invention, a web page providing method including a web server accessed by a user terminal to perform a flash game, and a game server for transmitting and receiving game information to/from the user terminal when the flash game is performed, and providing a web page for flash game execution to the user terminal connected through a network includes: a) providing a web page including a skin flash that is a frame on a flash game screen, a UI flash that is a user interface on the flash game screen, and a game contents flash; b) transmitting a game start signal from the user terminal through the UI flash or the skin flash; and c) on the web page, controlling the game to be performed by the game contents flash so that a flash game may be performed through individual execution of a skin flash, a UI flash, and a game contents flash.

In another aspect of the present invention, a web page providing method including a web server accessed by a user terminal to perform a flash game, a game server for transmitting and receiving game information to/from the user terminal when the flash game is performed, and a message server for providing a predetermined message to the user terminal, and providing a web page for providing a flash game and a message to the user terminal connected through a network includes: a) providing the web page in which source information on the skin flash that is a frame on the flash game screen by the web server, and realizing the skin flash on the web page; and b) the skin flash checking game contents flash source information as game contents corresponding to a game ID of the selected flash game from flash game execution information so that the game contents flash may be realized at a predetermined position on the web page, and the skin flash realizing the message provided by the message server into a UI flash for providing a message on the web page.

In another aspect of the present invention, provided is a recording medium for recording a program for controlling the above-noted methods to be executed by a computer.

In another aspect of the present invention, provided is a web server forming a network with a game server for transmitting and receiving game information to/from a user terminal when performing a flash game, and providing a web page for flash game execution to the user terminal connected through the network, wherein when a predetermined flash game execution is selected by the user terminal, the web server provides a web page including skin flash source information, which is a frame on the flash game screen, and script for driving the skin flash on the web page, and the skin flash checks a UI flash, which is a user interface of a flash game corresponding to a game ID of the selected flash game, and game contents flash information from flash game execution information stored in the web server, and realizes the UI flash and the game contents flash at a predetermined position of the driven web page so that a flash game may be performed by individual execution of the skin flash, UI flash, and game contents flash.

In another aspect of the present invention, provided is a web server forming a network with a game server for transmitting and receiving game information to/from a user terminal and a message server for providing a predetermined message to the user terminal, and being accessed by the user terminal to perform a flash game, wherein when a predetermined flash game execution is selected by the user terminal, the web server provides a web page including skin flash source information, which is a frame on the flash game screen, and script for driving the skin flash on the web page, the skin flash includes flash game execution information for providing game contents flash source information that is flash game contents for the respective flash game IDs, checks corresponding game contents flash source information from the flash game execution information, and performs the game contents flash at a predetermined position on the web page, and a UI flash for providing a message is realized on the web page by the skin flash, and the UI flash provides the message following a corresponding game ID from among the messages stored in the message server based on the pre-stored message information and the flash game execution information.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE ILLUSTRATED EMBODIMENTS

Figure 1:
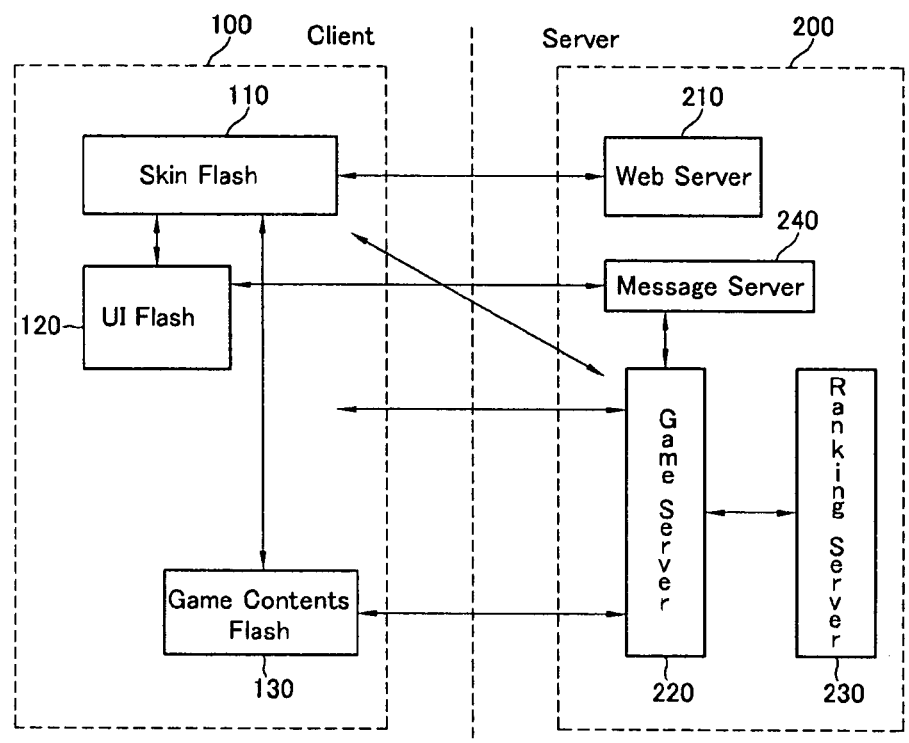
FIG. 1 shows a schematic diagram for performing a flash module at a client by an online flash game providing system according to an embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

As shown in FIG. 1, the online flash game providing system according to the embodiment of the present invention is connected to a user terminal 100 through the Internet and it includes a web server 210, a game server 220, a ranking server 230, and a message server 240.

The user terminal 100 is a communication terminal for accessing the online flash game providing system through the Internet and for performing flash games, and for example, a mobile communication terminal, a desktop computer, a portable computer, and other various communication devices are applicable to the user terminal 100.

In this instance, the game includes a skin flash 110, a UI flash 120, and a game contents flash 130.

The skin flash 110 functions as a flash game launcher, and it is initially performed when the user attempts to perform the flash game and it can perform or terminate the game.

The UI flash 120 is an interface provided to the user on the flash game screen, and for example, it includes a start button given when a flash game is loaded, a game ranking providing unit, an event notice unit, and an advertisement providing unit.

The game contents flash 130 is substantial game contents for the user to play the game through the user terminal 100.

The skin flash 110, the UI flash 120, and the game contents flash 130 will be described in further detail later.

The web server 210 functions as an interface for the user terminal 100 to access the online flash game providing system, converts various pieces of information provided by respective servers into predetermined communication standard data to provide the data to a plurality of user terminals 100, or receives information from the user terminal 100 through the Internet and provides the information to the respective servers.

The web server 210 provides various and selectable flash games to the user terminal 100 through the Internet, and it includes a skin flash module as a skin flash realization file into the user terminal 100, and flash game execution information.

The flash game execution information includes a plurality of pieces of flash game execution information that can be provided by the online flash game providing system, and it can be stored as a CONFIG.XML file.

For example, the flash game execution information includes a game name of a flash game, a game ID, version information, a UI flash configuring the flash game, a UI flash module for realizing game contents flashes, information on the game contents flash module, corresponding server information, and port information.

The web server 210 includes a skin flash module, and it controls the skin flash to be performed on the user terminal 100 and receives a game ID of a specific flash game selected by the user when the user selects the flash game.

The web server 210 receives a UI flash module of the corresponding flash game and information on the game contents flash module from the flash game execution information and controls the game contents flash 130 to be performed on the user terminal 100.

Also, the skin flash module of the web server 210 refers to the UI flash module as a default, and determines that a message such as an event notice is currently provided through a UI flash when the UI flash module is found.

The skin flash module drives the UI flash module to control the progress of messages such as events or advertisements.

In this instance, the UI flash module of the flash game and the game contents flash module can be included in the web server 210, an additional server, or the game server 220.

The UI flash module and the game contents flash module can be configured to be performed and terminated by control of the skin flash module.

Further, the web server 210 includes message information that has message types to be provided according to games, states whether predetermined event restrictions on the corresponding messages (e.g., a predetermined event is provided when the score is greater than 10,000 points) are established, and a message providing time.

In this instance, message information can also be provided by an additional message server 240.

Here, the UI flash module compares the flash game execution information with the message information, and controls the events and advertisements to be displayed on the flash game screen on the user terminal according to the message type, message providing time, and event restriction condition.

The game server 220 is a real-time server compared to the general request and answer servers.

That is, the game server 220 consecutively checks game results that are transmitted irrespective of the status of requests given by the user terminal having accessed the game server 220, and transmits/receives information to/from the user terminal 100.

The ranking server 230 connected to the game server 220 generates and provides ranking information of game users based on the game result data provided by the game server 220.

The ranking server 230 provides the generated ranking information to the user terminal 100 through the game server, and it can be configured to directly provide the ranking information to the same.

The message server 240 stores predetermined event messages, notice messages, and advertisement messages so that the message server 240 may provide a predetermined message when the flash game starts or during the flash game.

The message server 240 can provide the messages to the user terminal 100 through the game server 220, or can directly provide the same to the user terminal 100.

Figure 2:
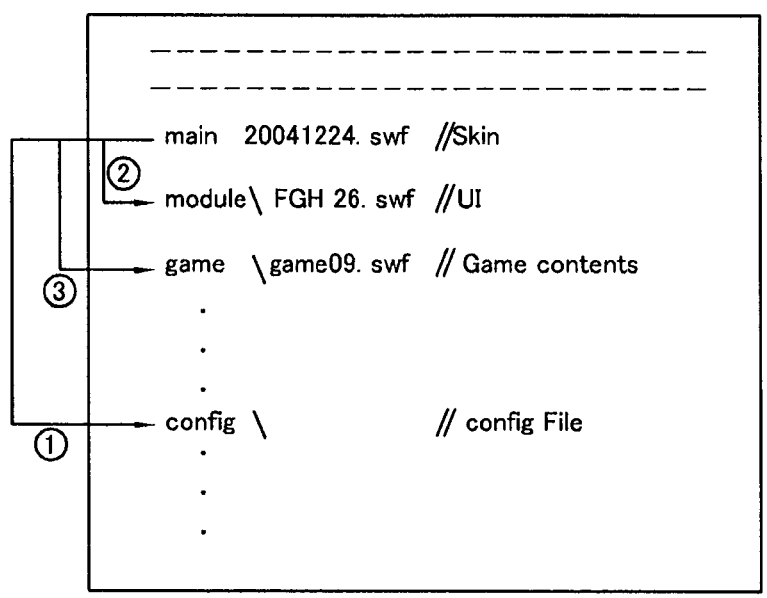
FIG. 2 shows an exemplified information sequence that is referred to so as to configure a web page when the web page is provided by a web server of the online flash game providing system according to an embodiment of the present invention.

FIG. 2 shows an exemplified information sequence referred to so as to configure a web page when the web page is provided by a web server of an online flash game providing system according to an embodiment of the present invention.

In this instance, the web page provided by the web server has skin flash source information and flash game execution information, and a UI flash source and a game contents flash source are not displayed as source codes of the web page.

As shown in FIG. 2, the flash game according to the embodiment of the present invention includes a skin flash, a UI flash, and a game contents flash, and when the user accesses the web server 210 to select execution of a specific flash game, the web server 210 controls the skin flash as well as the skin flash module to be performed on the user terminal 100.

The skin flash module refers to flash game execution information to receive a UI flash module of the corresponding flash game and information for performing the game contents flash module (e.g., a UI flash module, URL information including a game contents flash module, server information for the user terminal to access a server having a UI flash module or a game contents flash module, and port information) (1).

For example, the skin flash module performs the UI flash module to display a game start button and a UI flash on the user terminal's flash game screen (2) based on the information transmitted from the flash game execution information such as CONFIG.XML.

The skin flash module performs the game contents flash module to progress the flash game (3) based on the information transmitted by the flash game execution information.

For example, on receiving a selection signal for the game start button from the user terminal, the skin flash module performs the game contents flash module so that the game contents flash may be displayed on the user terminal screen.

In this instance, the skin flash module is performed irrespective of the game types selected by the user to thus display the web page including the skin flash on the screen of the user terminal 100, and the skin flash module can be simultaneously performed by referring to the UI flash module for displaying messages such as advertisements.

That is, the skin flash module refers to the UI flash module as a default, and determines that the message, such as an advertisement or an event, is currently provided when a UI flash module is found so that the corresponding UI flash module may realize the flash for providing a message on the flash game screen of the user terminal 100.

The UI flash module then controls the subsequent message progress.

The UI flash module analyzes the message information to compare the message information with game execution information, and receives a message corresponding to the game in progress from the message server 240 to display the message on the screen of the user terminal 100.

When the message display has a condition, the UI flash module can provide the message depending on the condition.

Figure 3:
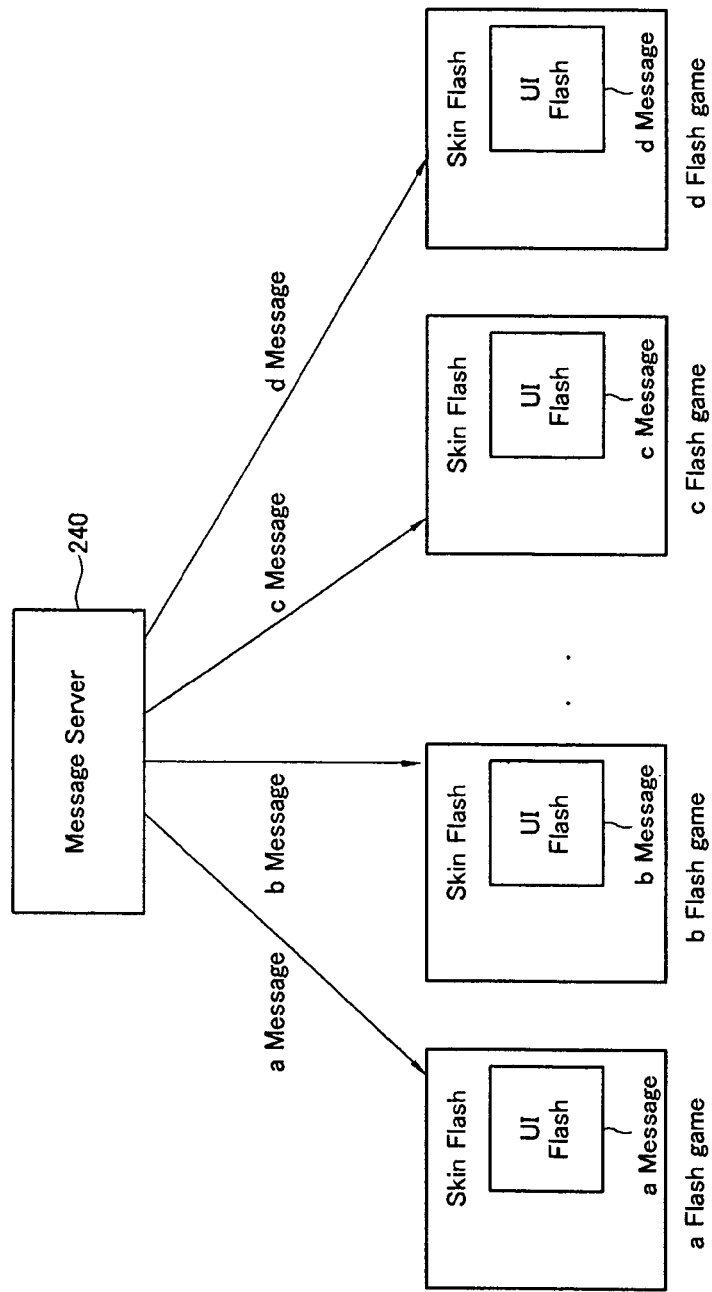
FIG. 3 shows a block diagram for messages that are provided from a message server to respective games by skin flashes according to an embodiment of the present invention.

That is, as shown in FIG. 3, when the message server 240 stores an event message, an advertisement message, an entire notice message, and a UI flash module, the skin flash module realizes the game contents flash on the screen of the user terminal 100 based on the game execution information, and simultaneously realizes the UI flash 130 for providing the message.

A message corresponding to the game in progress is provided from the message server 240 by control of the UI flash module.

For example, when the message server 240 stores an a-message, a b-message, a c-message, and a d-message, flash games with the game IDs of a, b, c, and d are currently performed in each user terminal 100, and the a-message, b-message, c-message, and d-message are established in the message information as messages to be provided to the a flash game, b flash game, c flash game, and d flash game, and the UI flash module analyzes message information and compares it with game execution information.

The UI flash module controls the message flashes displaying the a-message, b-message, c-message, and d-message to be respectively realized according to the game types, that is, the game IDs of the flash games in progress.

In this instance, when it is established as a restriction condition of providing the d-message in the message information that the game score is greater than 1,000 points, the UI flash module can control the d-message to be displayed when the game data corresponding to 1,000 points are transmitted to the game server 220.

Therefore, when a message that is to be provided for each game ID is established to the message information without individually realizing the corresponding event or advertisement posting box in the case in which it is needed to post a predetermined event or an advertisement, the messages that are designated by the skin flash module and the UI flash module can be provided by the respective games.

In particular, as the types of flash games have become various and the number thereof has increased, it is very useful to totally control the messages provided to the respective games by using the UI flash module that is generated separate from the game contents and message information instead of individually realizing the messages.

Also, the UI flashes of the respective flash games can transmit user responses for the displayed messages to the server.

For example, when a UI flash for notifying a predetermined event is realized on the screen of the user terminal 100, the UI flash can transmit information on the user's click state to the server for collecting event information.

Therefore, it is totally performed and controlled to provide messages for respective flash games and to check user response results, which can also be performed concurrently for the respective games.

Figure 4:
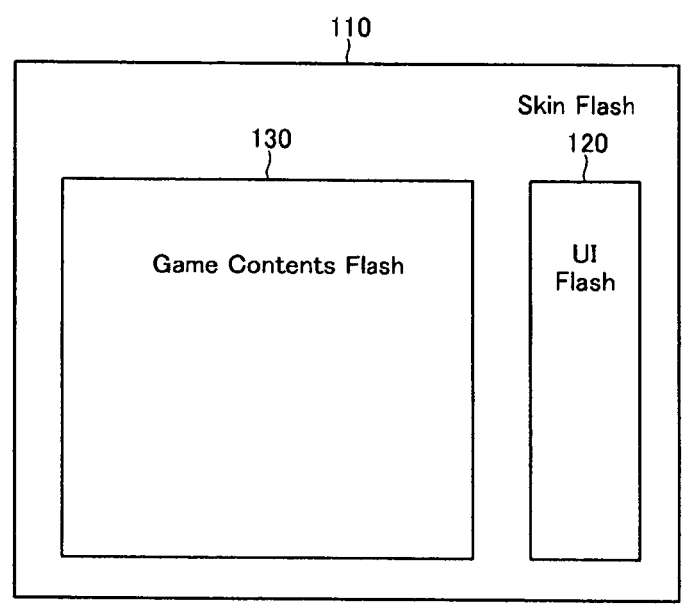
FIG. 4 shows a client screen when a flash game is executed by an online flash game providing system according to an embodiment of the present invention.

FIG. 4 shows an exemplified screen configuration for a flash game displayed on the screen of the user terminal 100 when a skin flash module, a UI flash module, and a game contents flash module are performed.

First, the flash game screen includes a skin flash 110, a UI flash 120, and a game contents flash 130.

The skin flash 110 is performed first on the user terminal 100 when the flash game is performed, and the skin flash 110 can surround the UI flash 120 and the game contents flash 130 in a like manner of a frame.

In this instance, the skin flash 110 can control the UI flash 120 and the game contents flash 130 to be loaded on the skin flash 110 in a similar manner to how the conventional web browser loads web pages.

Also, in the case of some games, the skin flash 110 is provided to and performed by the user terminal 100, and the skin flash module controls the UI flash module and the game contents flash module, and in this case, the skin flash 110 can be configured in an invisible manner.

The UI flash 120 is provided in common to all games irrespective of game types.

For example, in order to actually generate the select flash game, the UI flash includes a game start button displayed on the game screen of the user terminal 100, a how to play part for explaining game play methods, a rank information providing an interface for providing rank information of game users, and an event notice interface, and it can additionally include a game user character display interface.

In further detail, the UI flash 120 notify events according to corresponding games or a game service provider's game service policy, and can display predetermined notice information.

In this instance, the messages, such as displayed event information or announcement, can be provided by the message server 240, or they can be transmitted through the game server 220.

The messages displayed through the UI flash 120 depend on the flash game types in progress based on the message information including the message types provided for respective games, event restriction items for the corresponding messages, and message providing times, and also rank information at the time processed by the ranking server 230 can be provided.

Also, the UI flash 120 transmits user response information on the displayed message to the server.

Therefore, the user responses to the messages of the respective games in progress can be concurrently checked for the respective games by the UI flash 120.

The game contents flash 130 is substantial game contents for the user to play the game, and it excludes the UI flash unit including the game start button, ranking display blanks, and event display blanks.

However, it is not always required that the game contents flash 130 excludes the parts realized through the UI flash 120 as described above, and it is obvious that the game contents flash 130 can include a separate UI or an additional UI.

The game contents flash 130 realizes the original game function excluding additional functions or functions that are commonly processed with other game contents flashes.

Therefore, when various types of flash games are developed, the original game functions are developed other than the additional functions, such as the event notice or ranking information provision, and hence, loads generated by the game development are reduced and job efficiency is increased.

In particular, when the flash games are developed by a plurality of outsourced developers and a game service provider supplies the flash game provided by the outsourced developers, the outsourced developers individually developed ranking information or event announcements and received information for establishing a communication route with the corresponding server for providing corresponding information from the corresponding game service providers.

As a result, the parts that are realized in common for performing the flash game were repeatedly developed by developers, additional costs were generated, and internal system information of the game service providers was continuously supplied to the outside.

However, as described above, when the game contents flash 130 and the UI flash 120 are separately developed and the skin flash 110 for controlling the flashes 120 and 130 is separately provided, the game contents flash developers only need communication protocol information with the skin flash 110.

That is, the game is progressed by the game contents flash 130, the skin flash 110 starts or terminates execution of the corresponding game contents flash and can provide event notice and ranking information to the user terminal 100 through the UI flash 120 based on the information game start and finish information transmitted by the game contents flash 130.

Also, the flash game is divided into the skin flash 110, the UI flash 120, and the game contents flash 130 according to its functions, and the flash game can be developed according to the most efficient development condition or processing method depending on the functions to be realized.

For example, the skin flash 110, the UI flash 120, and the game contents flash 130 can be developed under different conditions by using the fact that the program language C/C++ provides fast processing speed but has an inefficient development condition and the program language C# provides a relatively slow processing speed but supports DB or XML and provides various control points.

In this instance, a communication protocol for sharing information among the skin flash 110, the UI flash 120, and the game contents flash 130 is to be generated.

Figure 5:
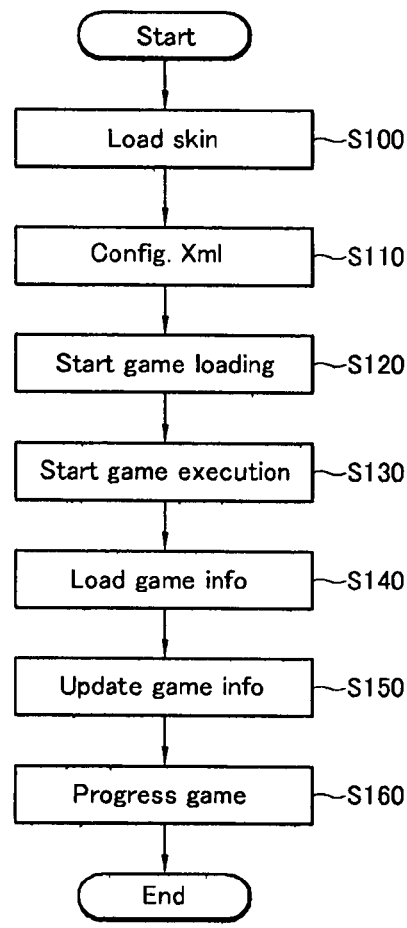
FIG. 5 shows a flowchart for an online flash game providing method according to an embodiment of the present invention.

Referring to FIG. 5, an online flash game providing method according to an embodiment of the present invention will now be described.

First, when the user accesses the online flash game providing web server 210 through the user terminal 100 to select a specific flash game start, the skin flash module of the web server 210 controls the skin flash 110 for controlling the UI flash 120 and the game contents flash 130 to be performed on the screen of the user terminal 100 (S100).

The skin flash module checks flash game information corresponding to the flash game ID selected by the user based on the flash game execution information such as CONFIG.XML stored in the web server 210 or an additional server (S110).

The skin flash module controls the UI flash module or the game contents flash module so that the game may be loaded on the screen of the user terminal 100 while the UI screen of the corresponding flash game is displayed (S120).

When the user clicks the game start button displayed on the screen of the user terminal 100 the game starts (S130).

That is, on receiving start information on a predetermined game, the skin flash module controls the game information for substantial game progress to be loaded to the user terminal 100 by the game contents flash module, and if needed, controls the game information to be updated (S140, S150).

By the game contents flash module, a game progress screen is loaded on the screen of the user terminal 100 and the game starts (S160).

Figure 6:
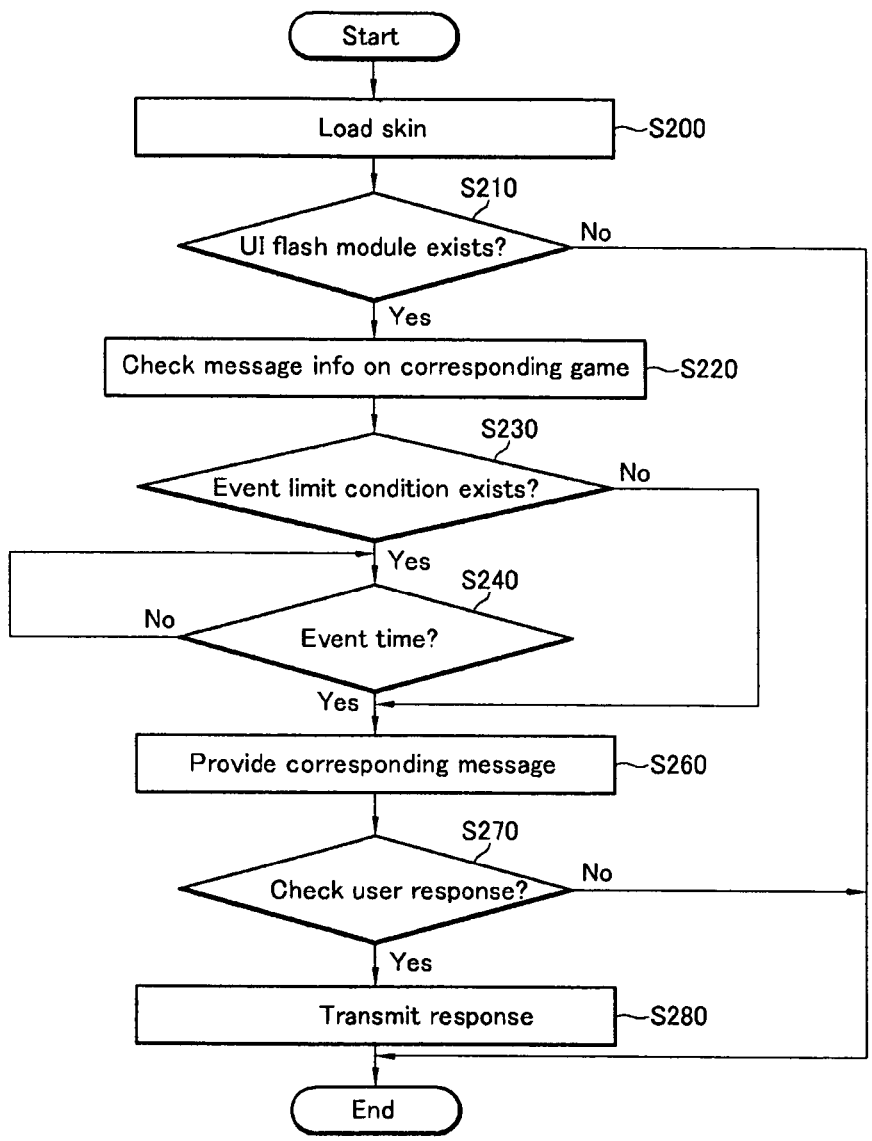
FIG. 6 shows a flowchart for a message notifying method in a flash game according to an embodiment of the present invention.

Referring to FIG. 6, a message providing method within the flash game according to an embodiment of the present invention will now be described in detail.

First, when the user accesses the flash game providing web server 210 through the user terminal 100 to select a specific flash game start, the skin flash 110 is performed on the screen of the user terminal 100 by the skin flash module of the web server 210 (S200).

The skin flash module checks flash game information corresponding to the flash game ID selected by the user based on the flash game execution information stored in the web server 210 or an additional server.

The skin flash module controls the game contents flash module so that the game may be loaded on the screen of the user terminal 100.

In this instance, the skin flash module can refer to the UI flash module as a default (S210).

That is, when a UI flash module is provided, the skin flash module controls the UI flash for providing messages by the UI flash module to be realized on the user terminal, and controls subsequent messages to be provided by control of the UI flash module.

The UI flash module analyzes pre-stored message information to compare it with flash game execution information (S220).

The UI flash module receives events or advertisements from the message server according to the message types provided to the corresponding games, and displays the events or advertisements to the flash game screen of the user terminal 100.

In this instance, when there is a predetermined restriction condition in the message providing condition according to the message information analysis result, the UI flash module receives the corresponding message from the message server 240 based on the restriction condition and displays the message on the flash game screen of the user terminal 100 (S230, S240, S260).

Also, user response information to the respective messages can be transmitted to the associated server by the UI flash module so as to totally process the user response check on the events provided for various flash games (S270,S280).

For example, when the UI flash 120 for notifying a predetermined event is realized in the screen of the user terminal 100, the UI flash 120 can transmit information on the user's click state to the server for collecting event information.

Therefore, message provision to the respective flash games and user response results are totally checked and managed, which can also be performed concurrently for the respective games.

A storage medium according to the embodiment of the present invention is a storage medium for recording a program for executing the above-noted methods in the computer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For example, the above-described online flash game providing system includes a web server, a game server, and a ranking server, and the configuration for the servers can be further classified or added to.

Also, the skin flash module, the UI flash module, and the game contents flash module can be included in the above-noted web server, the game server, or an additional server.

The skin flash module, the UI flash module, and the game contents flash module can be provided in the same server or different servers.

As described above, according to the embodiment of the present invention, contents to be developed are simplified and job efficiency is increased when various flash games are developed and supplied.

In particular, in the service for providing flash games provided by a plurality of outsourced developers, the problem of repeatedly developing common parts used for execution of flash games by developers, the problem of additional increase of costs, and the problem of consecutively supplying internal system information of the game service providers are solved.

Also, since the flash game is divided into a skin, a UI, and a game contents flash depending on its functions, the skin, the UI, and the game contents flash can be developed according to their functions to be realized by using the most efficient development condition or processing method.

Hence, it is expected to improve the performance of flash games.

When the flash games are additionally developed and updated, it is needed to add or update the flash game execution information file after adding or updating the corresponding flash game contents to thereby provide easy development and management on a plurality of flash games.

Further, a flash game is performed on the web page by division of a skin flash, a UI flash, and a game contents flash, but the game contents flash and the UI flash are realized at a predetermined position of the web page in the skin flash functioning as a game frame on the screen of the user terminal, and hence, the user feels as if he plays the game with a single flash file.

When the types and number of flash games are varied, the messages provided to the respective games are totally controlled through flash game execution information without individually realizing the messages, and the checks on the user response results to the provision of messages are totally controlled.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An integrated message providing system, the system comprising:
    a processor configured to process a request for a first game among a plurality of games associated with the integrated message providing system;
    an interface module, coupled to the processor, configured to provide the first game to a user terminal in response to receipt of the request for the first game, the interface module comprising a skin module, a user interface (UI) module, and a game contents module, the requested first game being configured to be performed on a screen of the user terminal,
    wherein the skin module is coupled to the processor and is configured to control the UI module and the game contents module to perform the first game using execution information corresponding to the first game, and
    wherein the skin module is configured to control the UI module to compare message information with the execution information and to provide a message based on the comparison.

2. The integrated message providing system of claim 1, wherein:
    the interface module is configured to provide a second game to the user terminal in response to receipt of a request for the second game;
    the message is associated with the first game and another message is associated with the second game;
    the UI module is configured to display the message associated with the first game on the screen of the user terminal while the first game is being executed; and
    the UI module is configured to display the other message associated with the second game on the screen of the user terminal while the second game is being executed.

3. The integrated message providing system of claim 2, wherein:
    the message associated with the first game and the other message associated with the second game are stored in an integrated message storage for a plurality of games associated with the interface module.

4. The integrated message providing system of claim 3, wherein:
    the message associated with the first game is configured to be provided from the integrated message storage to the screen of the user terminal through the UI module, based on the execution information corresponding to the requested first game.

5. The integrated message providing system of claim 3, wherein:
the message information comprises pre-stored message information;
game contents of the first game is configured to be executed through the game contents module; and
the message associated with the first game is configured to be provided through the UI module based on the pre-stored message information.

6. The integrated message providing system of claim 1, wherein:
the message information comprises at least one of a message type, a restriction condition for providing a message, and a message providing time.

7. The integrated message providing system of claim 6, wherein:
the UI module is configured to receive user response information responsive to the message information provided to the user terminal.

8. The integrated message providing system of claim 6, wherein:
the game contents module is configured to identify an amount of points acquired by a user of the user terminal while playing the first game;
the restriction condition is an achievement of the certain amount of points with respect to the first game; and
the UI module is configured to provide a message indicating that the user achieved a certain amount of points with respect to the first game.

9. The integrated message providing system of claim 1, wherein:
the message information is analyzed for the comparison; and
the comparison comprises a comparison of a restriction condition for providing the message with the execution information corresponding to the first game.

10. The integrated message providing system of claim 1, wherein:
the skin module is configured to operate the requested first game on the screen regardless of types of execution information.

11. An integrated message providing system, comprising:
a user interface (UI) module, coupled to a computer, configured to realize a message on a game screen of a first game, the message being associated with the first game;
a game contents module, coupled to the computer, configured to realize game contents of the first game on the game screen; and
a skin module, coupled to the computer, configured to control the UI module and the game contents module by loading a UI and game contents through a skin to realize the game contents of the first game on the game screen according to execution information, and to realize the message associated with the UI,
wherein the skin is configured to control the UI module to compare message information with the execution information and to provide the message based on the comparison.

12. The integrated message providing system of claim 11, wherein:
the message information comprises at least one of a message type, a message providing restriction condition, and a message providing time stored in an integrated message storage for providing respective games.

13. The integrated message providing system of claim 11, wherein:
the UI module is stored in the computer, and
providing the message based on the comparison comprises the UI module being configured to receive a message comprising a game identity (ID) of the first game, and to realize the message information on a user terminal.

14. The integrated message providing system of claim 13, wherein:
the UI module is configured to receive user response information associated with the message information.

15. A computer-implemented method of providing an integrated message providing service, the method comprising:
in response to receiving a request for a first game, providing an interface module comprising a skin module, a user interface (UI) module, and a game contents module, wherein the requested first game is performed on a screen of a user terminal;
controlling, by the skin module executed by a processor, the UI module and the game contents module to configure a user interface and game contents through a skin for providing a plurality of games associated with an integrated message providing system; and
controlling, by the skin module, the UI module to compare message information with execution information associated with the first game and to provide a message based on the comparison.

16. The computer-implemented method of claim 15, wherein:
the skin module is configured to perform the skin irrespective of a selected game type, and
the skin is realized for performing a selected one of the plurality of games on the screen in response to selecting an execution of a game.

17. The computer-implemented method of claim 15, wherein:
the execution information associated with the first game comprises at least one of a game name of the first game, a game ID of the first game, version information of the first game, a UI associated with the first game, game contents associated with the first game, corresponding server information, and port information.

18. The computer-implemented method of claim 15, wherein:
the user interface and the game contents are configured on the screen to display at least one of a game start button for starting a selected game, game information how to play, a ranking information providing interface for providing ranking information associated with game users, and an event notice interface.

19. The computer-implemented method of claim 15, further comprising:
loading the execution information performed by the game contents module that comprises information about communication protocol between the game contents and the skin, wherein at least one of game start information and game finish information is transmitted to the skin.

20. A non-transitory, computer-readable storage medium comprising an executable program, which when executed by a processor of a server, performs the method of claim 15.

21. The computer-implemented method of claim 19, further comprising:
transmitting and receiving game information in response to transmitting the game start information to the skin;
providing a game result in response to transmitting the game finish information to the skin; and controlling the game result to be realized on the screen through the UI module.

22. A computer-implemented method of providing an integrated message providing service, the method comprising:

realizing a skin, which provides a game screen of a user terminal, in response to detection of a game being selected, the skin being associated with game contents of the selected game and a user interface (UI) to configure the selected game to be displayed on the screen of the user terminal; and controlling, by a processor, a UI module and a game contents module by a skin module to perform the selected game using execution information corresponding to the selected game, wherein the skin module is configured to control the UI module to compare message information with the execution information and to provide a message based on the comparison.

23. The computer-implemented method of claim 22, wherein:

the message information comprises at least one of a message type, a message providing restriction condition, and a message providing time; and the message information is provided for respective games.

24. The computer-implemented method of claim 23, wherein:

comparing the message information with the execution information and providing the message based on the comparison comprises:

receiving a message associated with a game identity (ID) of the selected game from an integrated message storage; and realizing the message information.

25. The computer-implemented method of claim 22, further comprising:

transmitting user response information associated with the message provided via the UI.

* * * * *